(12) United States Patent
Liu et al.

(10) Patent No.: US 8,902,539 B1
(45) Date of Patent: Dec. 2, 2014

(54) DATA STORAGE DEVICE REDUCING SEEK POWER CONSUMPTION

(71) Applicant: Western Digital Technologies, Inc., Irvine, CA (US)

(72) Inventors: Kexiu Liu, Foothill Ranch, CA (US); Orhan Beker, Dove Canyon, CA (US); Mingji Lou, Corona, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/276,192

(22) Filed: May 13, 2014

(51) Int. Cl.
G11B 5/596 (2006.01)
G11B 5/55 (2006.01)
G11B 21/08 (2006.01)

(52) U.S. Cl.
CPC ............ G11B 5/5547 (2013.01); G11B 21/08 (2013.10)
USPC ..................................... 360/78.06; 369/30.17

(58) Field of Classification Search
None
See application file for complete search history.

(56) References Cited

U.S. PATENT DOCUMENTS

| | | | |
|---|---|---|---|
| 5,268,804 A * | 12/1993 | Wallis | 360/78.04 |
| 5,381,279 A * | 1/1995 | Dunn | 360/75 |
| 5,668,680 A * | 9/1997 | Tremaine | 360/78.07 |
| 6,014,283 A | 1/2000 | Codilian et al. | |
| 6,038,096 A | 3/2000 | Zhang et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,115,205 A | 9/2000 | Waugh et al. | |
| 6,122,133 A | 9/2000 | Nazarian et al. | |
| 6,122,135 A | 9/2000 | Stich | |
| 6,140,791 A * | 10/2000 | Zhang | 318/632 |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,445,531 B1 | 9/2002 | Gaertner et al. | |
| 6,462,896 B1 | 10/2002 | Codilian et al. | |

(Continued)

Primary Examiner — Thang Tran (57) ABSTRACT

A data storage device is disclosed comprising a disk comprising a plurality of tracks, a head, and an actuator configured to actuate the head over the disk. An adjusted seek time is determined to seek the head from a first track to a second track, and an adjusted coast velocity and an adjusted coast time of the seek is determined based on the adjusted seek time and a power consumption of the seek when a driving current applied to the actuator is substantially constant during at least one of an acceleration time and a deceleration time of the seek.

18 Claims, 4 Drawing Sheets

(56) References Cited

U.S. PATENT DOCUMENTS

| | | | |
|---|---|---|---|
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 | 4/2003 | Bennett et al. | |
| 6,560,056 B1 | 5/2003 | Ryan | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,608,460 B1 * | 8/2003 | Okada | 318/567 |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,690,536 B1 | 2/2004 | Ryan | |
| 6,693,764 B1 | 2/2004 | Sheh et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,220 B1 | 5/2004 | Codilian | |
| 6,744,590 B2 * | 6/2004 | Chu et al. | 360/78.06 |
| 6,747,837 B1 | 6/2004 | Bennett | |
| 6,754,036 B2 | 6/2004 | Dehnert | |
| 6,760,186 B1 | 7/2004 | Codilian et al. | |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,809,896 B2 | 10/2004 | Espeseth et al. | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,847,502 B1 | 1/2005 | Codilian | |
| 6,850,383 B1 | 2/2005 | Bennett | |
| 6,850,384 B1 | 2/2005 | Bennett | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,952,322 B1 | 10/2005 | Codilian et al. | |
| 6,954,324 B1 | 10/2005 | Tu et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 | 12/2005 | Codilian et al. | |
| 6,977,789 B1 | 12/2005 | Cloke | |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 | 2/2006 | Miyamura et al. | |
| 6,999,263 B1 | 2/2006 | Melkote et al. | |
| 6,999,267 B1 | 2/2006 | Melkote et al. | |
| 7,006,320 B1 | 2/2006 | Bennett et al. | |
| 7,016,134 B1 | 3/2006 | Agarwal et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,046,472 B1 | 5/2006 | Melkote et al. | |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,098 B1 | 5/2006 | Yu et al. | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,085,096 B2 | 8/2006 | Baek et al. | |
| 7,088,547 B1 | 8/2006 | Wang et al. | |
| 7,095,579 B1 | 8/2006 | Ryan et al. | |
| 7,110,208 B1 | 9/2006 | Miyamura et al. | |
| 7,110,214 B1 | 9/2006 | Tu et al. | |
| 7,113,362 B1 | 9/2006 | Lee et al. | |
| 7,113,365 B1 | 9/2006 | Ryan et al. | |
| 7,116,505 B1 | 10/2006 | Kupferman | |
| 7,126,781 B1 | 10/2006 | Bennett | |
| 7,158,329 B1 | 1/2007 | Ryan | |
| 7,180,703 B1 | 2/2007 | Subrahmanyam et al. | |
| 7,184,230 B1 | 2/2007 | Chue et al. | |
| 7,196,864 B1 | 3/2007 | Yi et al. | |
| 7,199,966 B1 | 4/2007 | Tu et al. | |
| 7,203,021 B1 | 4/2007 | Ryan et al. | |
| 7,209,321 B1 | 4/2007 | Bennett | |
| 7,212,364 B1 | 5/2007 | Lee | |
| 7,212,374 B1 | 5/2007 | Wang et al | |
| 7,215,504 B1 | 5/2007 | Bennett | |
| 7,224,546 B1 | 5/2007 | Orakcilar et al. | |
| 7,248,426 B1 | 7/2007 | Weerasooriya et al. | |
| 7,251,098 B1 | 7/2007 | Wang et al. | |
| 7,253,582 B1 | 8/2007 | Ding et al. | |
| 7,253,989 B1 | 8/2007 | Lau et al. | |
| 7,265,933 B1 | 9/2007 | Phan et al. | |
| 7,289,288 B1 | 10/2007 | Tu | |
| 7,298,574 B1 | 11/2007 | Melkote et al. | |
| 7,301,717 B1 | 11/2007 | Lee et al. | |
| 7,304,819 B1 | 12/2007 | Melkote et al. | |
| 7,315,432 B2 * | 1/2008 | Lee | 360/78.06 |
| 7,330,019 B1 | 2/2008 | Bennett | |
| 7,330,327 B1 | 2/2008 | Chue et al. | |
| 7,333,280 B1 | 2/2008 | Lifchits et al. | |
| 7,333,290 B1 | 2/2008 | Kupferman | |
| 7,339,761 B1 | 3/2008 | Tu et al. | |
| 7,365,932 B1 | 4/2008 | Bennett | |
| 7,388,728 B1 | 6/2008 | Chen et al. | |
| 7,391,583 B1 | 6/2008 | Sheh et al. | |
| 7,391,584 B1 | 6/2008 | Sheh et al. | |
| 7,433,143 B1 | 10/2008 | Ying et al. | |
| 7,440,210 B1 | 10/2008 | Lee | |
| 7,440,225 B1 | 10/2008 | Chen et al. | |
| 7,450,334 B1 | 11/2008 | Wang et al. | |
| 7,450,336 B1 | 11/2008 | Wang et al. | |
| 7,453,661 B1 | 11/2008 | Jang et al. | |
| 7,457,071 B1 | 11/2008 | Sheh | |
| 7,466,509 B1 | 12/2008 | Chen et al. | |
| 7,468,855 B1 | 12/2008 | Weerasooriya et al. | |
| 7,477,471 B1 | 1/2009 | Nemshick et al. | |
| 7,480,116 B1 | 1/2009 | Bennett | |
| 7,489,464 B1 | 2/2009 | McNab et al. | |
| 7,492,546 B1 | 2/2009 | Miyamura | |

(56) References Cited

U.S. PATENT DOCUMENTS

| | | |
|---|---|---|
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2006/0139792 A1* | 6/2006 | Lee .................... 360/78.06 |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

DATA STORAGE DEVICE REDUCING SEEK POWER CONSUMPTION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
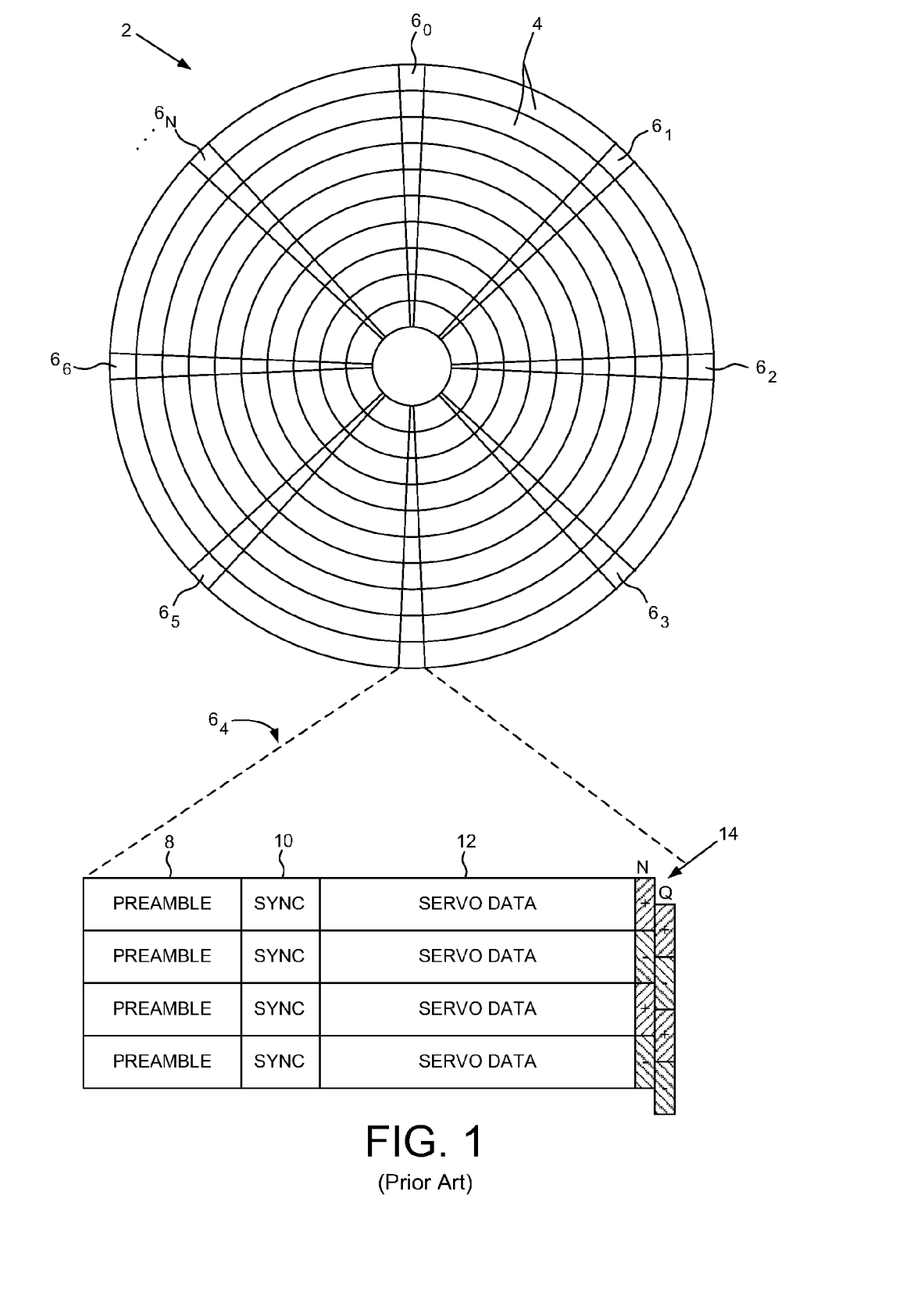
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
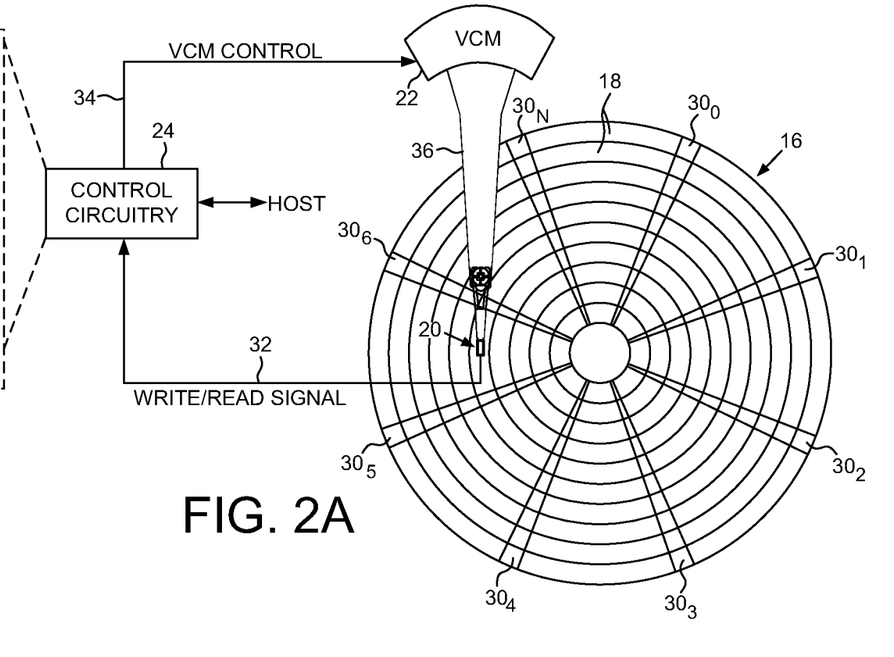
FIG. 2A shows a data storage device in the form of a disk drive according to an embodiment comprising a disk comprising a plurality of tracks, a head, and an actuator configured to actuate the head over the disk.
Figure 2B:
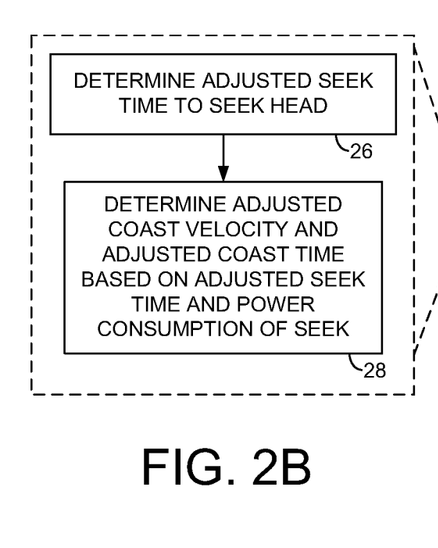
FIG. 2B is a flow diagram according to an embodiment wherein after determining an adjusted seek time, an adjusted coast velocity and an adjusted coast time are determined based on the adjusted seek time and a power consumption of the seek.

FIG. 2A shows a data storage device in the form of a disk drive according to an embodiment comprising a disk 16 comprising a plurality of tracks 18, a head 20, and an actuator 22 configured to actuate the head 20 over the disk 16. The disk drive further comprises control circuitry 24 configured to execute the flow diagram of FIG. 2B wherein an adjusted seek time to seek the head from a first track to a second track is determined (block 26), and an adjusted coast velocity and an adjusted coast time of the seek is determined based on the adjusted seek time and a power consumption of the seek (block 28) when a driving current applied to the actuator is substantially constant during at least one of an acceleration time and a deceleration time of the seek.

In the embodiment of FIG. 2A, a plurality of concentric servo tracks are defined by embedded servo sectors $30_0$-$30_N$, wherein concentric data tracks 18 are defined relative to the servo tracks at the same or different radial density, and each data track comprises a plurality of data sectors (not shown). The control circuitry 24 processes a read signal 32 emanating from the head 20 to demodulate the servo sectors and generate a position error signal (PES) representing an error between the actual position of the head and a target position relative to a target track. The control circuitry 24 filters the PES using a suitable compensation filter to generate a control signal 34 applied to a voice coil motor (VCM) 22 which rotates an actuator arm 36 about a pivot in order to actuate the head 20 radially over the disk 16 in a direction that reduces the PES. The control circuitry 24 may also generate a control signal applied to a microactuator (not shown) in order to actuate the head 20 over the disk 16 in fine movements. Any suitable microactuator may be employed, such as a piezoelectric actuator. In addition, the microactuator may actuate the head 20 over the disk 16 in any suitable manner, such as by actuating a suspension relative to the actuator arm, or actuating a slider relative to the suspension. The servo sectors $30_0$-$30_N$ may comprise any suitable head position information, such as a track address for coarse positioning and servo bursts for fine positioning. The servo bursts may comprise any suitable pattern, such as an amplitude based servo pattern or a phase based servo pattern.

Figure 3A:
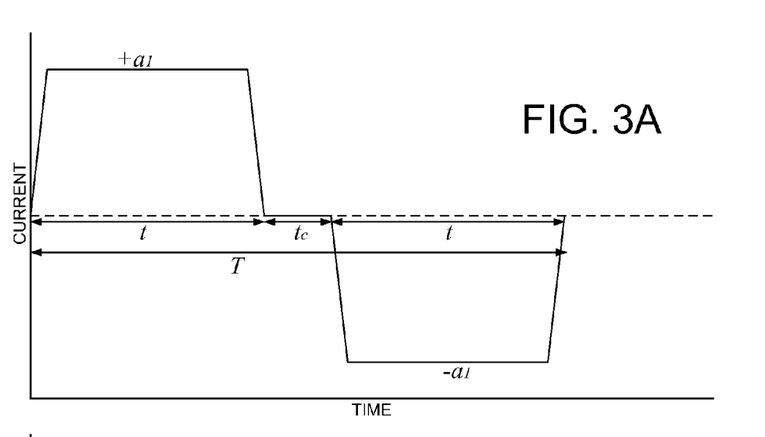
FIG. 3A shows a driving current profile for the actuator based on a nominal seek time to seek the head from a first track to a second track on the disk.

When executing an access operation (write/read operation), the control circuitry 24 generates a driving current applied to the actuator (e.g., VCM 22) in order to seek the head 20 from a current track to a target track. The time required to perform the seek (seek time) depends on the driving current profile, which determines an acceleration, coast velocity, and deceleration profile of the seek. That is, the faster the acceleration/deceleration and the higher the coast velocity, the less time required to perform the seek. FIG. 3A shows a model of a nominal driving current profile applied to the actuator during a seek resulting in a nominal seek time T. The nominal driving current profile of FIG. 3A comprises a substantially constant acceleration segment (+$a_1$) for time t, a coast velocity for coast time $t_c$, and a substantially constant deceleration segment (−$a_1$) for time t. If the seek is controlled based on the nominal driving current profile shown in FIG. 3A, the head 20 may arrive at the target track early such that there may be a rotational latency of the disk 16 before the target data sector reaches the head 20. In addition, performing the seek based on the nominal driving current profile shown in FIG. 3A may consume more power than needed. Accordingly, in one embodiment the power consumption of a seek may be reduced by adjusting the seek time (e.g., increase the seek time by adding the rotation latency of a nominal seek) and then adjusting the coast velocity and the coast time based on the adjusted seek time and a power consumption of the seek.

The parameters of the nominal driving current profile of FIG. 3A may be defined by the following equations:

$$2*t+t_c=T$$

$$a_1*t*t_c+a_1*t^2=S$$

$$V_c=a_1*t \quad (1)$$

where S represents the seek distance and $V_c$ represents the coast velocity. In an embodiment wherein the power consumption of the seek is based on root-mean-square (RMS) power, the seek power may be represented as:

$$P=2*a_1^2*t \quad (2)$$

and from equation (1) the seek power may be minimized by minimizing:

$$P = \frac{2*S^2}{t*(T-t)^2} \quad (3)$$

The seek power based on the above equation (3) may be minimized based on:

$$\frac{\partial P}{\partial t} = \frac{-2*S^2(T-3*t)}{t^2*(T-t)^3} \quad (4)$$

From equation (4), the optimal time for the acceleration/deceleration time t may be represented as:

$$t_{op} = \frac{T}{3} \quad (5)$$

The resulting minimum seek power consumption may be represented as:

$$P_{op} = \frac{27*S^2}{2*T^3} \quad (6)$$

the resulting optimal driving current magnitude may be represented as:

$$a_{op} = \frac{9*S}{2*T^2} \quad (7)$$

and the resulting optimal coast time may be represented as:

$$t_{cop} = \frac{T}{3} \quad (8)$$

The above equations (1) through (8) derive the parameters for the optimal driving current profile when performing a seek operation based on the nominal seek time T as shown in FIG. 3A. If the seek time is increased by adding available rotational latency to the seek time, the adjusted seek time may be represented as:

$$T_2=T+t_{la} \quad (9)$$

where $t_{la}$ represents the available rotational latency of a nominal seek. Accordingly, when the seek time is adjusted to the new seek time $T_2$, the optimal parameters of the driving current profile that will minimize the seek power consumption may be derived as follows. From equation (1), the coast velocity may be represented as:

$$V_c = 2 * \frac{S}{T+t_c} \quad (10)$$

and the driving current magnitude represented as:

$$a_1 = 4 * \frac{S}{T^2 - t_c^2} \quad (11)$$

Based on the above equations (1) and (3), the seek power consumption may be represented as:

$$P = 16 * \frac{S^2}{(T-t_c)(T+t_c)^2} \quad (12)$$

To make full use of the rotational latency $t_{la}$, the coast velocity $V_c$ will be reduced with the constraint that the new driving current magnitude $a_2$ will be smaller than the nominal driving current magnitude $a_1$ to avoid exciting resonances (i.e., $a_2<a_1$). From equation (11) the adjusted coast time $t_{c2}$ may be represented as:

$$t_{c2}^2<T_2^2-T^2+t_c^2 \quad (13)$$

Another constraint is that the adjusted coast velocity $V_{c2}$ be less than the nominal coast velocity $V_c$ (i.e., $V_{c2}<V_c$) and therefore from equation (10) the following condition must be satisfied:

$$t_{c2}>t_c-t_{la} \quad (14)$$

Accordingly, in one embodiment the adjusted coast time $t_{c2}$ may be represented based on equation (8) as:

$$t_{c2} = \begin{cases} \frac{T_2}{3} & \text{if } T_2^2-T^2+t_c^2 \geq \left(\frac{T_2}{3}\right)^2 \text{ and } \frac{T_2}{3} > t_c - t_{la} \\ \sqrt{T_2^2-T^2+t_c^2} & \text{if } (T_2^2-T^2+t_c^2) < \left(\frac{T_2}{3}\right)^2 \\ t_c - t_{la} & \text{Otherwise} \end{cases} \quad (15)$$

The adjusted coast velocity $V_{c2}$ may be represented based on equations (10) and (15) as:

$$V_{c2} = \begin{cases} \frac{3S}{2T_2} & \text{if } T_2^2 - T^2 + t_c^2 \geq \left(\frac{T_2}{3}\right)^2 \text{ and } \frac{T_2}{3} > t_c - t_{la} \\ \frac{2S}{T_2 + \sqrt{T_2^2 - T^2 + t_c^2}} & \text{if } (T_2^2 - T^2 + t_c^2) < \left(\frac{T_2}{3}\right)^2 \\ V_c & \text{Otherwise} \end{cases} \quad (16)$$

The adjusted driving current $a_2$ may be represented based on equations (11), (15) and (16) as:

$$a_2 = \begin{cases} a_1 * \frac{9}{8} * \frac{T^2 - t_c^2}{T_2^2} & \text{if } T_2^2 - T^2 + t_c^2 \geq \left(\frac{T_2}{3}\right)^2 \text{ and } \frac{T_2}{3} > t_c - t_{la} \\ a_1 & \text{if } (T_2^2 - T^2 + t_c^2) < \left(\frac{T_2}{3}\right)^2 \\ a_1 * \frac{T - t_c}{T_2 - t_c + t_{la}} & \text{Otherwise} \end{cases} \quad (17)$$

Figure 3B:
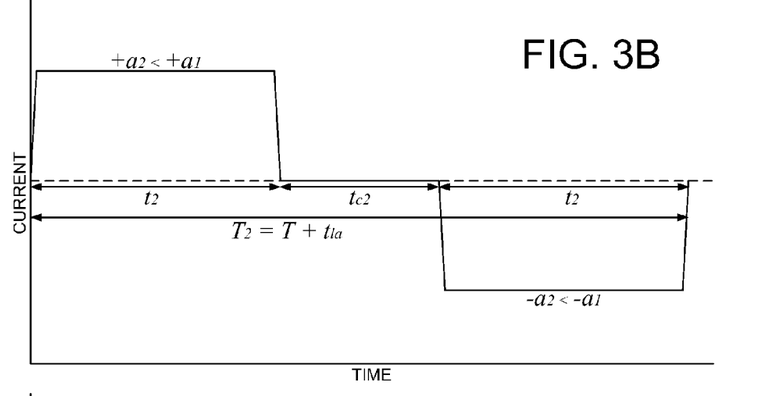
FIG. 3B shows a driving current profile for the actuator according to an embodiment based on an adjusted seek time and based on a root-mean-square (RMS) power consumption of the seek.

FIG. 3B shows an example driving current profile derived using the above equations based on minimizing a RMS power when the nominal seek time T for a given seek operation is increased to seek time $T_2$ by adding the available rotational latency $t_{la}$.

In another embodiment, the seek power consumption may be minimized based on a mean power consumption which may be represented as:

$$P = 2 * a_1 * \frac{t}{T} \quad (18)$$

From equations (1), (11) and (18) the seek power may be represented as:

$$P = \frac{4S}{T(T + t_c)} \quad (19)$$

Therefore from equation (19), the longer the coast time, the less power will be consumed; however, the constraints of equation (13) and (14) still need to be satisfied. Accordingly, in one embodiment the adjusted coast time $t_{c2}$ may be represented as:

$$t_{c2} = \sqrt{T_2^2 - T^2 + t_c^2} \quad (20)$$

the adjusted coast velocity $V_{c2}$ may be represented as:

$$V_{c2} = \frac{2S}{T_2 + \sqrt{T_2^2 - T^2 + t_c^2}} \quad (21)$$

and the adjusted driving current may be represented as:

$$a_2 = a_1 \quad (22)$$

Figure 3C:
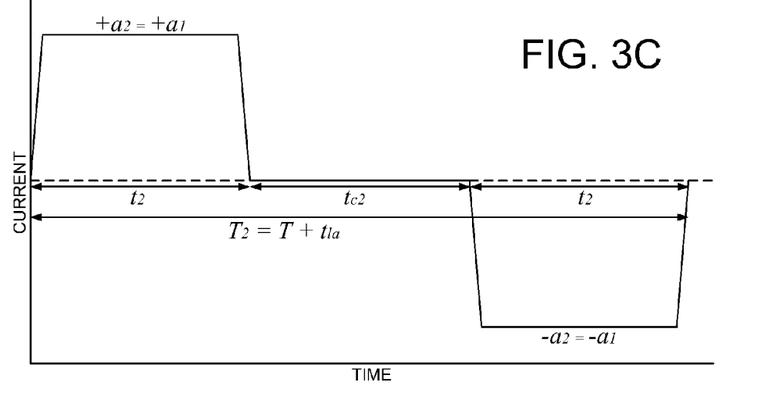
FIG. 3C shows a driving current profile for the actuator according to an embodiment based on an adjusted seek time and based on a mean power consumption of the seek.

FIG. 3C shows an example driving current profile derived using the above equations based on minimizing a mean seek power when the nominal seek time T for a given seek operation is increased to seek time $T_2$ by adding the available rotational latency $t_{la}$.

In one embodiment, the control circuitry 24 may derive the adjusted coast velocity and the adjusted coast time (and optionally the adjusted driving current) based on the above equations using any suitable technique, such as implementing the equations directly, or implementing the results of the equations as a lookup table. In one embodiment, the adjusted driving current profiles such as shown in FIGS. 3B and 3C are a modeled representation of the actual driving current profile generated by the control circuitry 24 during a seek operation. The actual driving current profile may differ based on the servo algorithm employed, which may include a linear controller that forces one or more servo states to follow a servo state profile, and/or a non-linear controller (e.g., a sliding mode controller) which may be implemented, for example, during a settle operation. Accordingly, in one embodiment the adjusted coast velocity and the adjusted coast time (and optionally the adjusted driving current) derived using the above equations may be used to adjust one or more seek parameters of the servo control algorithm so that the resulting seek power is reduced (not necessarily minimized).

Figure 4A:
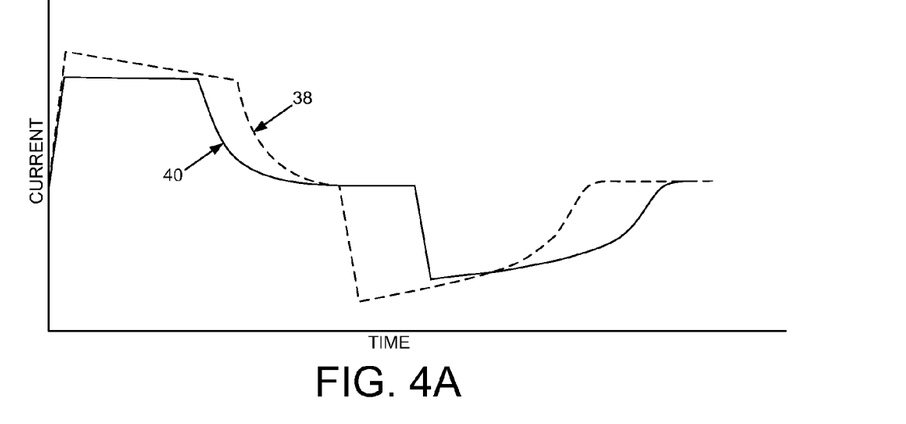
FIG. 4A illustrates an observed driving current profile according to an embodiment that is based on the adjusted coast velocity and the adjusted coast time.
Figure 4B:
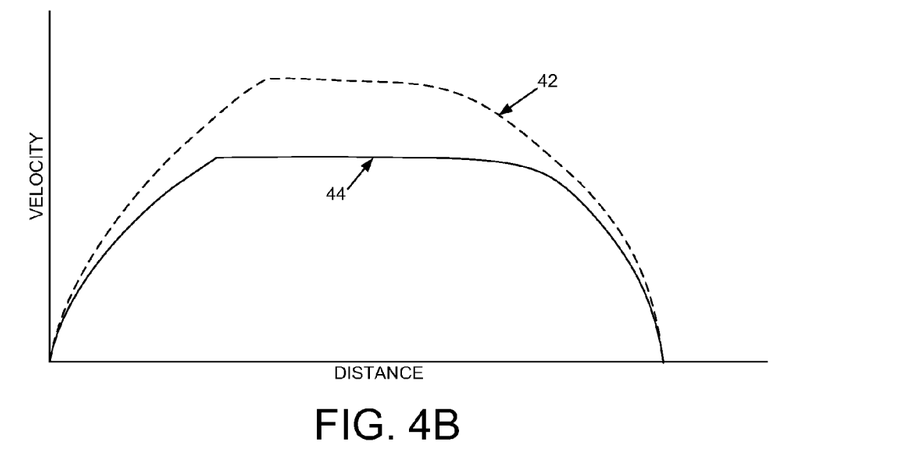
FIG. 4B illustrates an observed velocity profile according to an embodiment that is based on the adjusted coast velocity and the adjusted coast time.

FIG. 4A illustrates an actual (observed) driving current profile 38 when executing a seek operation based on the nominal seek time T together with the actual (observed) driving current profile 40 after adjusting at least one seek parameter based on the adjusted seek time $T_2$ and the corresponding adjusted coast velocity and adjusted coast time as determined from the above equations. FIG. 4B shows a corresponding actual (observed) velocity profile 42 when executing a seek operation based on the nominal seek time T together with the actual (observed) velocity profile 44 after adjusting at least one seek parameter based on the adjusted seek time $T_2$ and the corresponding adjusted coast velocity and adjusted coast time as determined from the above equations. These figures illustrate that in one embodiment reducing the seek power by adjusting the seek parameter(s) based on the adjusted seek time $T_2$ and the corresponding adjusted coast velocity and adjusted coast time as determined from the above equations results in a reduced coast velocity and an increased coast time.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk comprising a plurality of tracks;
a head;
an actuator configured to actuate the head over the disk; and
control circuitry configured to:
determine an adjusted seek time to seek the head from a first track to a second track; and
determine an adjusted coast velocity and an adjusted coast time of the seek based on the adjusted seek time and a power consumption of the seek when a driving current applied to the actuator is substantially constant during at least one of an acceleration time and a deceleration time of the seek.

2. The data storage device as recited in claim 1, wherein the control circuitry is further configured to determine the adjusted coast time $t_{c2}$ based on:

$$t_{c2} = \sqrt{T_2^2 - T^2 + t_c^2}$$

where:
T represents a nominal seek time for the seek based on a nominal coast velocity and a nominal coast time $t_c$; and
$T_2$ represents the adjusted seek time.

3. The data storage device as recited in claim 2, wherein the control circuitry is further configured to determine the adjusted coast velocity $V_{c2}$ based on:

$$V_{c2} = \frac{2S}{T_2 + \sqrt{T_2^2 - T^2 + t_c^2}}$$

where S represents a distance of the seek.

4. The data storage device as recited in claim 1, wherein the control circuitry is further configured to determine the adjusted coast time $t_{c2}$ based on:

$$t_{c2} = \begin{cases} \dfrac{T_2}{3} & \text{if } T_2^2 - T^2 + t_c^2 \geq \left(\dfrac{T_2}{3}\right)^2 \text{ and } \dfrac{T_2}{3} > t_c - t_{la} \\ \sqrt{T_2^2 - T^2 + t_c^2} & \text{if } (T_2^2 - T^2 + t_c^2) < \left(\dfrac{T_2}{3}\right)^2 \\ t_c - t_{la} & \text{Otherwise} \end{cases}$$

where:
T represents a nominal seek time for the seek based on a nominal coast velocity and a nominal coast time $t_c$; and
$T_2$ represents the adjusted seek time; and
$t_{la}$ represents a difference between $T_2$ and T.

5. The data storage device as recited in claim 4, wherein the control circuitry is further configured to determine the adjusted coast velocity $V_{c2}$ based on:

$$V_{c2} = \begin{cases} \dfrac{3S}{2T_2} & \text{if } T_2^2 - T^2 + t_c^2 \geq \left(\dfrac{T_2}{3}\right)^2 \text{ and } \dfrac{T_2}{3} > t_c - t_{la} \\ \dfrac{2S}{T_2 + \sqrt{T_2^2 - T^2 + t_c^2}} & \text{if } (T_2^2 - T^2 + t_c^2) < \left(\dfrac{T_2}{3}\right)^2 \\ V_c & \text{Otherwise} \end{cases}$$

where S represents a distance of the seek.

6. The data storage device as recited in claim 5, wherein the control circuitry is further configured to determine an adjusted driving current $a_2$ of the adjusted seek time based on:

$$a_2 = \begin{cases} a_1 * \dfrac{9}{8} * \dfrac{T^2 - t_c^2}{T_2^2} & \text{if } T_2^2 - T^2 + t_c^2 \geq \left(\dfrac{T_2}{3}\right)^2 \text{ and } \dfrac{T_2}{3} > t_c - t_{la} \\ a_1 & \text{if } (T_2^2 - T^2 + t_c^2) < \left(\dfrac{T_2}{3}\right)^2 \\ a_1 * \dfrac{T - t_c}{T_2 - t_c + t_{la}} & \text{Otherwise} \end{cases}$$

where T represents a nominal seek time for the seek based on a nominal coast velocity, a nominal coast time $t_c$, and a nominal driving current $a_1$.

7. The data storage device as recited in claim 6, wherein $a_2 \leq a_1$.

8. The data storage device as recited in claim 1, wherein the control circuitry is further configured to determine a seek parameter based on the adjusted coast time and the adjusted coast velocity.

9. The data storage device as recited in claim 8, wherein the control circuitry is further configured to determine the seek parameter based on an adjusted driving current corresponding to the adjusted coast time and the adjusted coast velocity.

10. A method of operating a data storage device, the method comprising:
determining an adjusted seek time to seek a head from a first track to a second track on a disk; and determining an adjusted coast velocity and an adjusted coast time of the seek based on the adjusted seek time and a power consumption of the seek when a driving current applied to an actuator is substantially constant during at least one of an acceleration time and a deceleration time of the seek.

11. The method as recited in claim 10, further comprising determining the adjusted coast time $t_{c2}$ based on:

$$t_{c2} = \sqrt{T_2^2 - T^2 + t_c^2}$$

where:

T represents a nominal seek time for the seek based on a nominal coast velocity and a nominal coast time $t_c$; and $T_2$ represents the adjusted seek time.

12. The method as recited in claim 11, further comprising determining the adjusted coast velocity $V_{c2}$ based on:

$$V_{c2} = \frac{2S}{T_2 + \sqrt{T_2^2 - T^2 + t_c^2}}$$

where S represents a distance of the seek.

13. The method as recited in claim 10, further comprising determining the adjusted coast time $t_{c2}$ based on:

$$t_{c2} = \begin{cases} \dfrac{T_2}{3} & \text{if } T_2^2 - T^2 + t_c^2 \geq \left(\dfrac{T_2}{3}\right)^2 \text{ and } \dfrac{T_2}{3} > t_c - t_{la} \\ \sqrt{T_2^2 - T^2 + t_c^2} & \text{if } (T_2^2 - T^2 + t_c^2) < \left(\dfrac{T_2}{3}\right)^2 \\ t_c - t_{la} & \text{Otherwise} \end{cases}$$

where:

T represents a nominal seek time for the seek based on a nominal coast velocity and a nominal coast time $t_c$; and $T_2$ represents the adjusted seek time; and $t_{la}$ represents a difference between $T_2$ and T.

14. The method as recited in claim 13, further comprising determining the adjusted coast velocity $V_c$ based on:

$$V_{c2} = \begin{cases} \dfrac{3S}{2T_2} & \text{if } T_2^2 - T^2 + t_c^2 \geq \left(\dfrac{T_2}{3}\right)^2 \text{ and } \dfrac{T_2}{3} > t_c - t_{la} \\ \dfrac{2S}{T_2 + \sqrt{T_2^2 - T^2 + t_c^2}} & \text{if } (T_2^2 - T^2 + t_c^2) < \left(\dfrac{T_2}{3}\right)^2 \\ V_c & \text{Otherwise} \end{cases}$$

where S represents a distance of the seek.

15. The method as recited in claim 14, further comprising determining an adjusted driving current $a_2$ of the adjusted seek time based on:

$$a_2 = \begin{cases} a_1 * \dfrac{9}{8} * \dfrac{T^2 - t_c^2}{T_2^2} & \text{if } T_2^2 - T^2 + t_c^2 \geq \left(\dfrac{T_2}{3}\right)^2 \text{ and } \dfrac{T_2}{3} > t_c - t_{la} \\ a_1 & \text{if } (T_2^2 - T^2 + t_c^2) < \left(\dfrac{T_2}{3}\right)^2 \\ a_1 * \dfrac{T - t_c}{T_2 - t_c + t_{la}} & \text{Otherwise} \end{cases}$$

where T represents a nominal seek time for the seek based on a nominal coast velocity, a nominal coast time $t_c$, and a nominal driving current $a_1$.

16. The method as recited in claim 15, wherein $a_2 \leq a_1$.

17. The method as recited in claim 10, further comprising determining a seek parameter based on the adjusted coast time and the adjusted coast velocity.

18. The method as recited in claim 17, further comprising determining the seek parameter based on an adjusted driving current corresponding to the adjusted coast time and the adjusted coast velocity.

* * * * *